United States Patent [19]
Gryk

[11] Patent Number: 5,251,002
[45] Date of Patent: Oct. 5, 1993

[54] MODE TRANSITION MATRIX MEASURING SYSTEM

[75] Inventor: Thomas J. Gryk, Norwich, Conn.

[73] Assignee: The United States of America as represented by the Secretary of the Navy, Washington, D.C.

[21] Appl. No.: 841,105

[22] Filed: Feb. 25, 1992

[51] Int. Cl.$^5$ .................... G01N 21/59; G01N 21/84
[52] U.S. Cl. ................................................ 356/73.1
[58] Field of Search ........................................ 356/73.1

[56] References Cited

PUBLICATIONS

Okoshi et al., "Measuring the Complex Frequency Response of Multimode Optical Fibers", Applied Optics, vol. 20, No. 8, Apr. 15, 1981, pp. 1414–1417.

*Primary Examiner*—Vincent P. McGraw
*Attorney, Agent, or Firm*—Michael J. McGowan; Prithvi C. Lall; Michael F. Oglo

[57] ABSTRACT

A mode transition matrix measuring system for nondestructively calculating mode-dependent losses and coupling of a multi-mode, graded-index, connectorized, passive fiber optic component, the mode transition matrix measuring system comprising mode selective launcher means having a plurality of optical paths with varying launch conditions, input-output optic means having at least one reference optical path and at least one optical path for the passive fiber optic component under test, mode selective detection means having a plurality of optical paths with a variety of mode filters, and means for data storage and matrix calculation, wherein the mode transition matrix and the modal power vector are calculated using measurements of the optical power propagated through optical courses comprising the optical paths.

7 Claims, 4 Drawing Sheets

MODE TRANSITION MATRIX MEASURING SYSTEM

STATEMENT OF GOVERNMENT INTEREST

The invention described herein may be used by or for the Government of the United States of America for government purposes without the payment of any royalties thereon or therefore.

BACKGROUND OF THE INVENTION (1) Field of the Invention

The invention relates to a measurement system which quickly and nondestructively characterizes the mode-dependent losses and coupling of a multi-mode, graded index, connectorized, passive fiber optic component, and the modal sensitivity of a pigtailed optical source.

(2) Description of the Prior Art

Multimode fiber optic components are used primarily in low bit-rate, short haul communications systems. Current loss measurement techniques are unable to accurately predict the performance of a multimode component when utilized in a fiber optic system because such techniques are unable to account for mode dependent losses which often are exhibited by the multimode components.

A well known technique which at least partially characterizes a component's modal properties is the mode transition matrix method. The matrix formalism characterizes the modal properties of emitting components, such as light emitting diodes, using column vectors, detecting components, such as photodiodes, using row vectors, and passive components, such as connectors and couplers, using square matrices. The evolution of the optical power can be traced through an optical system composed of several components by multiplying each component's vector, or matrix, in reverse order of its physical sequence. For example, FIG. 1 illustrates a simple prior art optical system, including typical component matrix and vector values, which can be used to demonstrate the use of the mode transition matrix method. In the example, the emitting device is an 850 nm light emitting diode; the passive component is the coupled port of a 3 dB power splitter; and the detector is a silicon photodetector. The values of the vectors and matrix are obtained from measurements of the near field pattern as well as the total optical power both entering and exiting a passive component. The power propagation through the system is given by:

$$P_{out} = [1.0\ 1.0] \begin{bmatrix} 0.3 & 0.1 \\ 0.1 & 0.5 \end{bmatrix} \begin{bmatrix} 0.5 \\ 0.5 \end{bmatrix} P_{in}$$

and therefore the loss is calculated to be:

$$loss = -10 \log (P_{out}/P_{in})$$

Although the mode transition matrix method improves the ability to predict system loss over conventional methods, the technique is inherently complicated. The near field pattern measurements can be accomplished using a charge coupled device array or a closed circuit television camera, and the data must be processed using complicated mathematical operations, such as curve-fitting, differentiation, and integration. Each time a different component is tested, new measurements of the near field pattern are needed. This technique of measurement, hereinafter referred to as the conventional mode block representation, is well-known and documented.

SUMMARY OF THE INVENTION

It is, therefore, an object of the invention to provide a system for quickly and accurately determining the mode transition matrix of a passive fiber optic component and the modal power vector of a pigtailed optical source, which system does not require a measurement of the near field pattern, or any of the complicated operations which otherwise must be performed on the near field pattern, to calculate modal power distribution.

It is further an object of this invention to provide a novel system for calculating the mode transition matrix and the modal power vector which involves only the multiplication and inversion of matrices.

Still another object of this invention is to provide a system of determining the mode transition matrix which requires only an ability to measure the total optical power which propagates through various optical paths.

Yet another object of this invention is to provide a means of converting the power vector measured using the present novel system into the power vector as would be measured by the conventional mode block representation.

With the above and other objects in view, as will hereinafter appear, a feature of the present invention is the provision of a system using mode filters and fiber optic switches to create optical paths, with the measurement of power propagating through each optical path being the only measurements necessary to determine the mode transition matrix of a passive fiber optic component and the modal power vector of a pigtailed optical source.

In accordance with another feature of this invention, there is provided a device with optical paths of select characteristics comprising a serial combination of a mode selective launcher, an input/output section, and a mode selective detection section, each section containing a pair of fiber optic switches. The mode selective launcher allows the user to switch between underfilled and overfilled launch conditions, the input/output optics section provides the user with an optical path through a reference fiber or through the device under test, and the mode selective detection section allows the user to measure power in two independent mode groups, the low-order modes or the guided modes.

In accordance with a further feature of this invention, there is provided means for grouping measurements of optical power which propagates through each of the optical paths created by manipulating the fiber optic switches (a total of $2^3 = 8$) into two $2 \times 2$ matrices, with the power measurements describing the power propagated through the reference fiber denoted the "Input Matrix", and the power measurements describing the power propagated through the device under test denoted the "Output Matrix". The component's matrix measured relative to the mode groups selected by the invention is equal to the product of the output matrix and the inverse of the input matrix.

In accordance with still another feature of this invention, there is provided a means for theoretically determining the value of a transformation matrix from a description of the fiber used in the mode filters, where the transformation matrix converts the optical power vector measured using the mode transition matrix measuring system into the power vector which would be measured using the conventional mode block representation.

In accordance with still a further feature of this invention, there is provided a means of calculating the mode transition matrix by multiplying the inverse of the transformation matrix, the component's matrix measured relative to the mode groups selected, and the transformation matrix.

The above and other features of the invention, including various novel details of construction and combination of parts, will now be more particularly described with reference to the accompanying drawings and pointed out in the claims. It will be understood that the particular device and methods embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawing in which is shown an illustrative embodiment of the invention, from which its novel features and advantages will be apparent.

DESCRIPTION OF THE PREFERRED EMBODIMENTS

Figure 3:
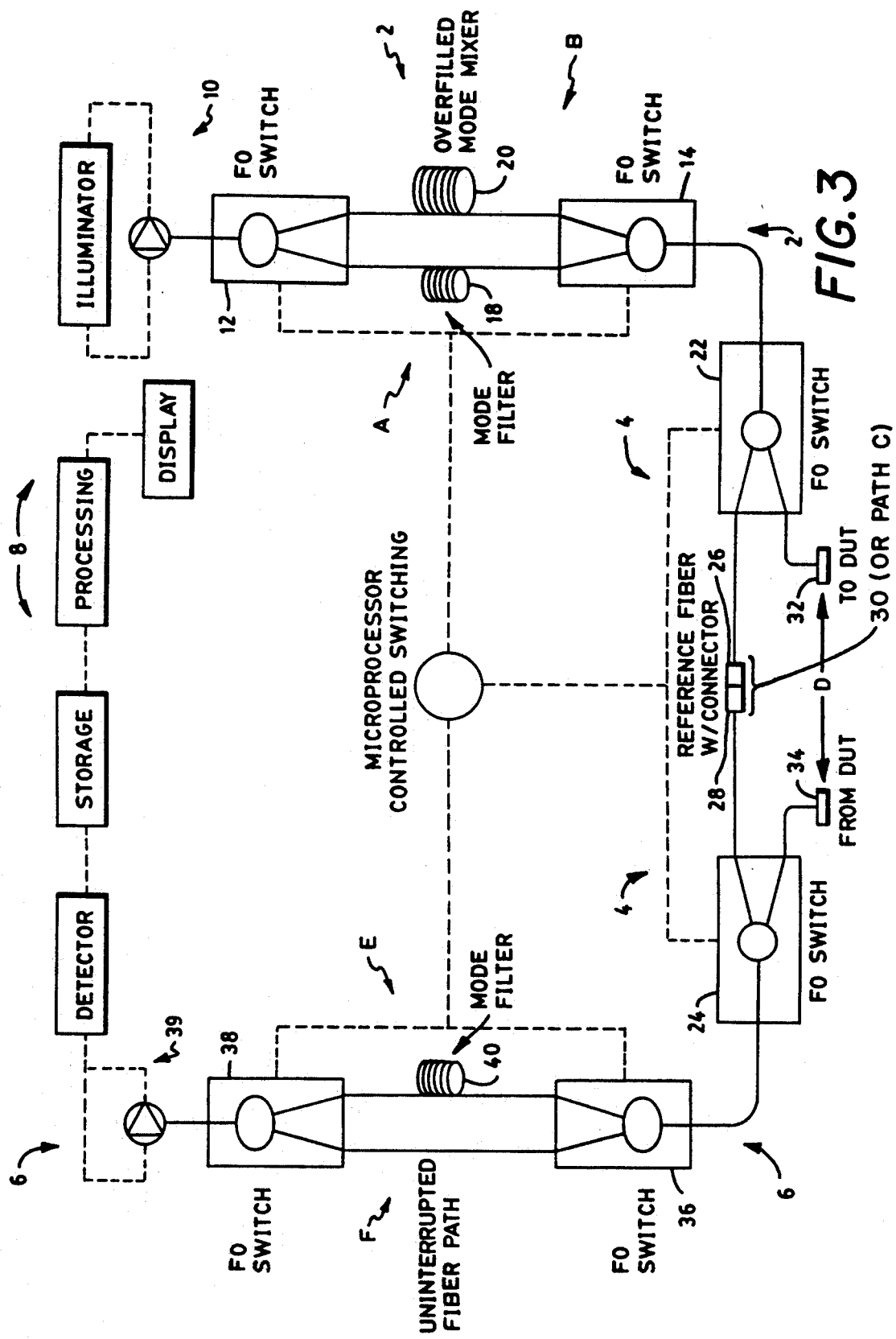
FIG. 3 is a diagrammatic illustration of a mode transition matrix measuring system with optional microprocessor controlled switching.

Referring to the drawings, particularly FIG. 3, it will be seen that an illustrative embodiment of the invention includes mode selective launcher means 2, input-output optics means 4, mode selective detector means 6, and data storage and matrix calculation means 8. With the exception of the mode filters and the overfilled mode mixer, all of the optical fiber employed by the invention should be similar in characteristics to that employed by the device (or component) under test (DUT).

Figure 2:
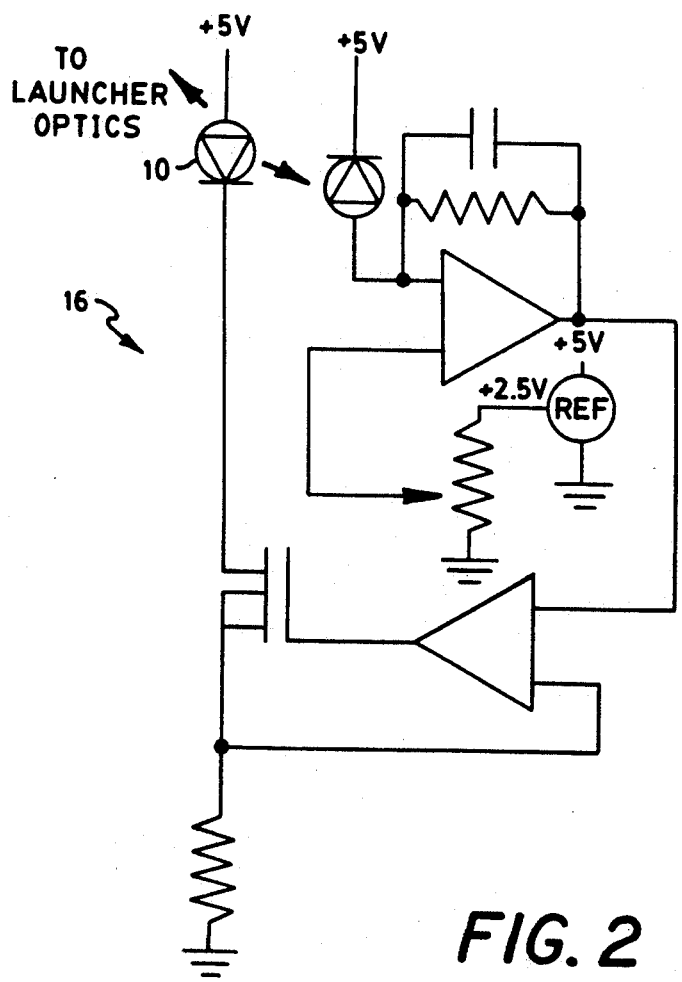
FIG. 2 is a diagrammatic illustration of one embodiment of an optical feedback circuit which may be used to maintain constant output optical power from a light emitting diode.

The mode selective launcher means 2 comprises a pigtailed, high-power light emitting diode (LED) 10 and first and second, single input-double output, fiber optic switches 12, 14. The LED 10 is connected to a feedback circuit 16 (FIG. 2) designed to maintain constant optical output power to the LED 10. The input of the first fiber optic switch 12 is serially connected to the output of the LED 10. One output of the first fiber optic switch 12 and one output of the second fiber optic switch 14 are connected using a piece of a 'small core' optical fiber 18 to form a first optical path A, which selectively filters high order modes from the device under test. The first optical path A provides underfilled launch conditions, because the undersized fiber 18 has low-pass characteristics. Parallel to the first optical path A, a second optical path B is formed by connecting the other output of the first fiber optic switch 12 and the other output of the second fiber optic switch 14 using a mode-mixing fiber 20. The second optical path B provides overfilled launch conditions because the mode-mixing fiber 20 has high-pass characteristics. The two fiber optic switches 12, 14 are operated in unison to provide selection between the underfilled and overfilled launch conditions of the first and second optical paths A and B, respectively.

The input-output optics means 4 comprises third and fourth fiber optic switches 22, 24 (same type as 12, 14). Y output of the third fiber optic switch 22 is terminated with one fiber optic connector 26, and one output of the fourth fiber optic switch 24 is terminated with a like fiber optic connector 28. A third optical path C is formed by mating the two fiber optic connectors 26, 28 to each other to create a reference fiber 30. Parallel to the third optical path C, a fourth optical path D is formed by terminating the other output of the third fiber optic switch 22 with a fiber optic connector 32, terminating the other output of the fourth fiber optic switch 24 with a like fiber optic connector 34, and mating each of the fiber optic connectors 32, 34 to the device under test (DUT), which is not shown. The input of the third fiber optic switch 22 is connected to the input of the second fiber optic switch 14, thus creating a serial connection between the mode selective launcher means 2 and the input-output optic means 4.

The mode selective detection means 6 comprises fifth and sixth fiber optic switches 36, 38, (same type as 12, 14) with the input of the sixth fiber optic switch 38 connected to the input of the detector circuitry. One output of the fifth fiber optic switch 36 is connected to one output of the sixth fiber optic switch 38 using a piece of undersized optical fiber 40 with the same characteristics as the optical fiber 18 used in the first optical path A of the mode selective launcher means 2, thus forming a fifth optical path E. Parallel to the fifth optical path E, a sixth optical path F is formed by connecting the other output of the fifth fiber optic switch 36 and the other output of the sixth fiber optic switch 38. The sixth fiber optic path F provides an uninterrupted path to the detector 39. Power may be measured using a power meter, such as the Photodyne Model 22XLC with a model 150 Silicon Detector Head, in two independent mode groups. The first group of measurements, obtained across the fifth optical path E, contain predominantly low-order modes, as the undersized optical fiber 40 connecting the fifth and sixth fiber optic switches 36, 38 filters the high-order modes. The second group of measurements, obtained across the sixth optical path F, contain all guided modes, as the sixth optical path F does not contain any fibers to interrupt travel to the detector circuitry. The detector in the detector circuitry must be large enough to collect all of the light exiting the optical fiber under test, and must be stable for the time duration of the power measurement.

The data storage and matrix calculation means 8 processes the information received from the detection circuitry. The pairs of fiber optic switches 12 and 14, 22 and 24, 36 and 38 allow a total of eight independent optical courses. The measurements of the optical power propagated through each of the courses shall hereinafter be denoted by $P_{xyz}$, where x describes the optical path selected in the mode selective launcher means 2 and can have the values A or B, y describes the optical path selected in the input-output optic means 4 and can have the values C or D, and z describes the optical path selected in the mode selective detection means 6 and can have the values E or F, the combination of which optical paths shall be an optical course. For example, $P_{ACE}$ is the power propagated through the first optical path A of the mode selective launcher means 2, the third optical path C of the input-output optic means 4, and the fifth optical path E of the mode selective detection means 6. The power measurements can be grouped into two 2×2 matrices. The first matrix shall hereinafter be called the "Input Matrix", and shall describe the power propagated through the reference fiber 30 in the third optical path C of the input-output optic means 4. The second matrix shall hereinafter be referred to as the "Output Matrix", and shall describe the power propagating through the device under test DUT in the path D of the input-output optic means 4. The Input and Output matrices are defined as:

$$I = \begin{bmatrix} P_{ACE} & P_{BCE} \\ P_{ACF} & P_{BCF} \end{bmatrix} O = \begin{bmatrix} P_{ADE} & P_{BDE} \\ P_{ADF} & P_{BDF} \end{bmatrix}$$

The matrix of the device under test measured relative to the mode groups selected, T', can be calculated by obtaining the dot product of the Output matrix and the inverse of the Input matrix:

$$T' = O \cdot I^{-1}$$

The mode transition matrix T may be obtained by rotating the optical power vector obtained using the present novel measuring system into the power vector which would be measured using the conventional mode block representation. This is accomplished using a transformation matrix M, which varies according to the type of fiber used in the first and fifth optical paths A and E, respectively. The transformation matrix is calculated by obtaining the dot product of the power vectors obtained in the conventional mode block representation and the inverse of the power vectors obtained in the present novel system:

$$M = [P_A P_B] \cdot [P_A' P_B']^{-1}$$

where $P_A$ and $P_B$ are the power vectors for the underfilled and overfilled mode distributions, respectively, obtained in the conventional mode block representation, and $P_A'$ and $P_B'$ are the power vectors for the underfilled and overfilled mode distributions, respectively, obtained in the present mode transition matrix measuring system. The values of the power vectors may be obtained experimentally or theoretically, as conceptually (or heuristically) illustrated in FIGS. 4 and 5.

Figure 4A:
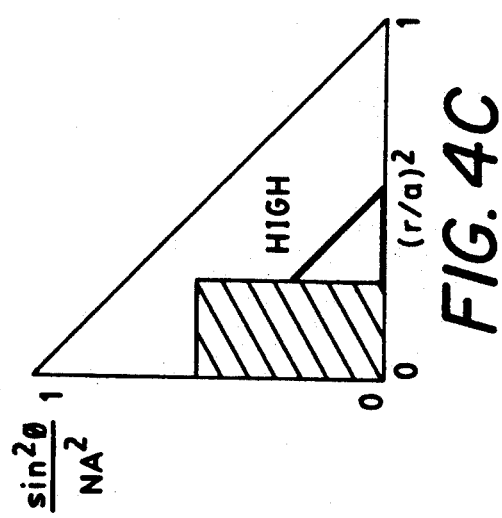
FIGS. 4A-F comprise a diagrammatic illustration of means for rotating an optical power vector measured using the mode transition matrix measuring system shown in FIG. 3, into a power vector which may be measured using a conventional mode block representation.
Figure 4B:
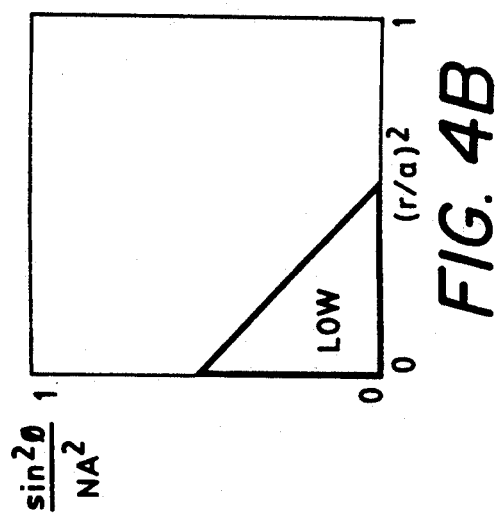
Figure 4C:
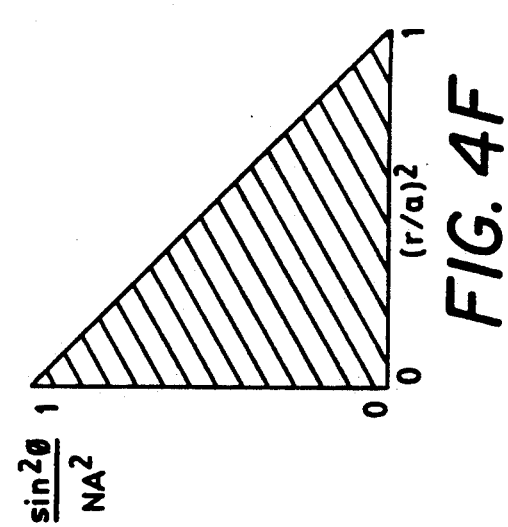
Figure 4D:
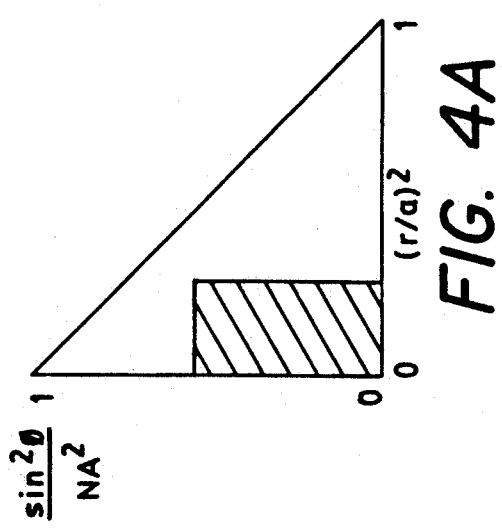
Figure 4E:
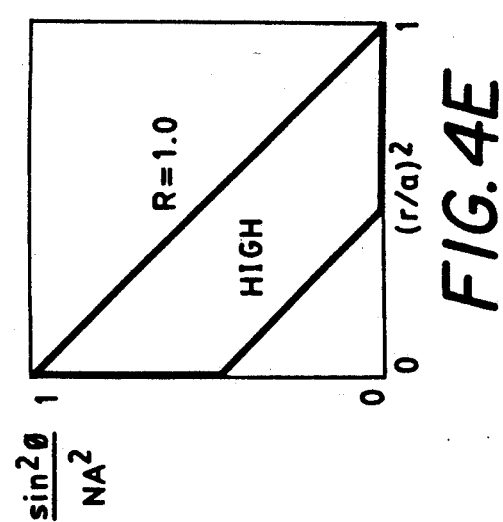
Figure 4F:
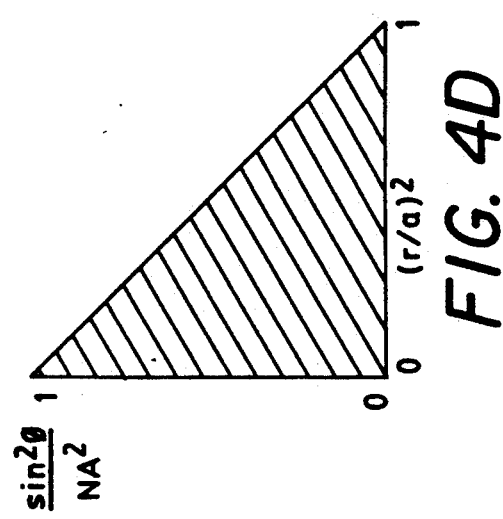

For example, FIG. 4A is a phase-space diagram in which the shaded region represents the fiber modes which contain optical power in a 100/140 μm fiber which has been excited by a 50/125 μm step-index fiber, as in the first optical path A. Projecting the shaded region of unit intensity onto the low- and high-order mode blocks of FIGS. 4B and 4E, the power vector obtained in the mode block representation is $P_A = [0.75, 0.25]$, because 75% or 0.75 of the fiber modes are contained within the low-order mode block region, and 25%, or 0.25 of the fiber modes are contained within the high-order mode block region, as depicted in FIG. 4C. Similarly, the shaded region of FIG. 4D showing a uniformly overfilled mode distribution is projected onto the low- and highorder mode blocks of FIGS. 4B and 4E to obtain the power vector $P_B = [0.25, 0.75]$, because 25% or 0.25 of the fiber modes are contained within the low-order mode block region, and 75% or 0.75 of the fiber modes are contained within the high-order mode block region, as depicted in FIG. 4E.

Figure 5A:
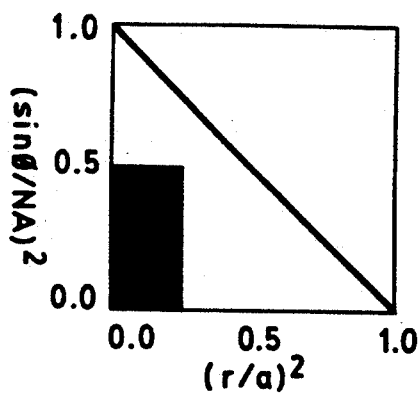
FIGS. 5A-C comprise diagrammatic illustrations of means for determining the optical power transmitted through two mode filters separated by a reference optical fiber.
Figure 5B:
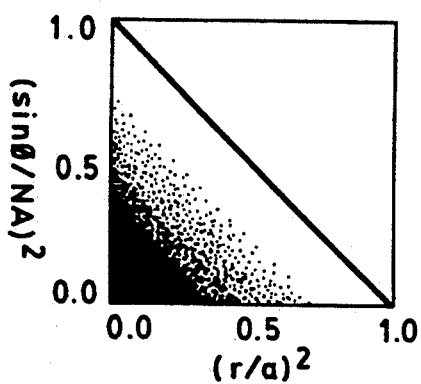
Figure 5C:
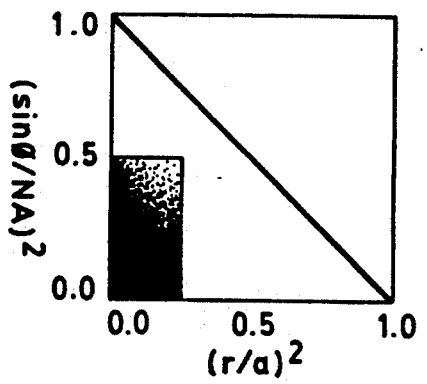

The power vectors $P_A'$ and $P_B'$ represent the power vectors obtained using the present mode transition matrix measuring system. The underfilled launch conditions are illustrated in FIG. 5A. The modes which lie along the diagonals are of the same radial mode number and are therefore nearly degenerate. Optical power is strongly coupled between these modes, and therefore the power contained in the square becomes uniformly distributed along these diagonal modes as seen in FIG. 5B. The fifth optical path E of the mode selective detector means 6 measures the power which is contained in the square group of modes illustrated in FIG. 5C. Therefore, in order to determined the power vector measured by the present mode matrix measurement system, the launched mode block must be projected onto the detector mode block after allowing for the averaging of power among degenerate modes. The resulting power vector for the underfilled launch condition is $P_A' = [0.6712, 1.0]$, because 67.12% or 0.6712 of the optical power from the mode-filtered launch is contained within the region of the detector mode block defined by the optical fiber used in the fifth optical path E, and 100% or all of the power from the mode-filtered launch is contained within the region of the detector mode block because the sixth optical path F allows an uninterrupted path to the detector circuitry. Similarly, the overfilled launch is projected onto the detector mode block after allowing for the averaging of power among degenerate modes, resulting in $P_B' = [0.25, 1.0]$, because 25% or 0.25 of the optical power from the overfilled launch is contained within the region of the detector block defined by the optical fiber 40 used in the fifth optical path E, and 100% or all of the power from the overfilled launch is contained within the region of the detector mode block because the sixth optical path F allows an uninterrupted path to the detector circuitry.

Figure 1:
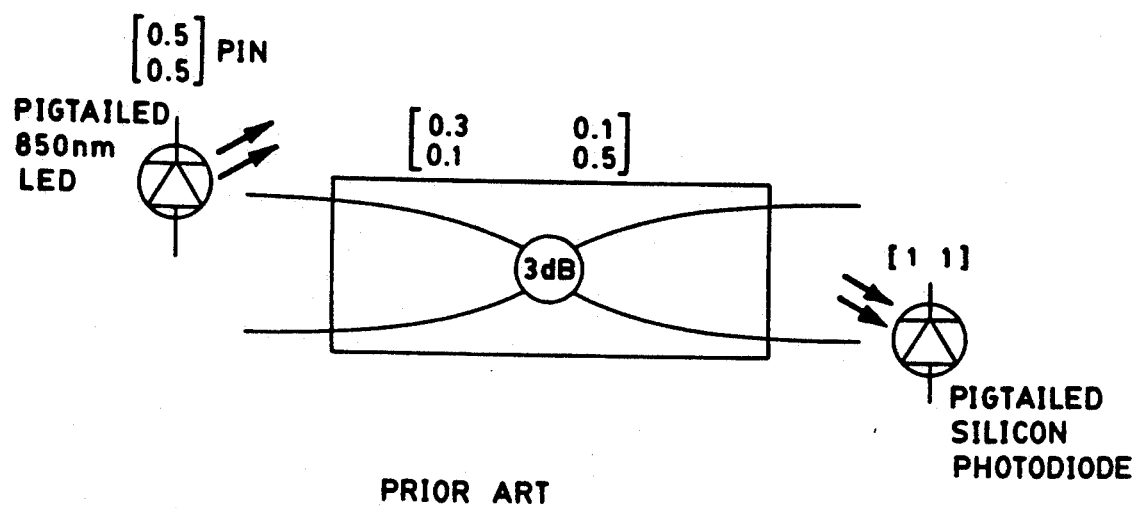
FIG. 1 is a diagrammatic illustration of a prior art optical system using a matrix technique to characterize an optical source, a passive component, and an optical detector.

Note that the hereinabove discussed matrix T' for a given DUT is not identical to the mode transition matrix, which in this discussion is designated T (i.e., the prime (') is absent). The latter matrix T is a representation associated with the prior art mode transition matrix method of FIG. 1. It is to be understood that T is related to T' by a similarity transform $$T = M^{-1} \cdot T' \cdot M$$

where M is a transformation matrix which can either theoretically be determined from a description of the fiber used in the mode filters, or measured experimentally.

The modal power vector of a pigtailed optical source can also be calculated using power measurements obtained using an alternative embodiment of the invention which effectively comprises employment of mode selective detector means 6, FIG. 3, as a "stand-alone unit". Specifically, this stand-alone unit would comprise fiber optic switches 36, 38, with the input of a detector circuitry connected to the input of the optic switch 38. A connectorized pigtail of an optical source (not shown) is connected to the input of the fiber optic switch 36. One output of the fiber optic switch 36 is connected to one output of the fiber optic switch 38 using the piece of undersized optical fiber 40 to filter high order modes, and thereby allow a low order mode power measurement to be taken. The other output of the fiber optic switch 36 is directly connected to the other output of the fiber optic switch 38 to allow a high-order power measurement to be taken. The power measurements across the undersized optical fiber 40 and across the direct connection are arranged into a column vector and then multiplied by the transformation matrix M to yield an input power vector $P_i$ to be used in system performance predictions.

There is thus provided a system which quickly and nondestructively characterizes the mode transition matrix of a passive fiber optic component and the modal power vector of a pigtailed optical source. In addition, the fiber optic switches in the matrix measuring system may be controlled using a microprocessor. Various types of mode filters and mode mixers may be used, including but not limited to, mandrel wraps and single mode fibers, as long as a transformation matrix can be either calculated or measured to transform the measured power vectors to the low and high order mode block power vectors.

It will be understood that many additional changes in the details, materials, steps and arrangement of parts, which have been herein described and illustrated in order to explain the nature of the invention, may be used by those skilled in the art within the principles and scope of the invention as expressed in the appended claims.

What is claimed is:

1. A mode transition matrix measurement system for nondestructively calculating mode-dependent losses and coupling of a multi-mode, graded-index, connectorized, passive fiber optic component, said mode transition matrix measuring system comprising:
   mode selective launcher means having a plurality of optical paths with varying launch conditions;
   input-output optic means having at least one reference optical path and at least one optical path for said passive fiber optic component under test;
   mode selective detection means having a plurality of optical paths with a variety of mode filters; and
   means for data storage and matrix calculation, wherein the mode transition matrix and the modal power vector are calculated using measurements of the optical power propagated through optical courses comprising said optical paths.

2. The mode transition matrix measuring system in accordance with claim 1, wherein said mode selective launcher comprises a pigtailed high-power light emitting diode connected to a feedback circuit to maintain constant optical power to said light emitting diode, and first and second fiber optic switches operable in unison to provide selection between first and second optical paths, said first switch connecting to said light emitting diode, said first optical path comprising small-core optical fiber to selectively filter high-order modes from said passive fiber optic component being tested, and said second optical path comprising a mode-mixing fiber to provide an overfilled mode distribution to said passive fiber optic component being tested, thereby providing selective switching between underfilled and overfilled conditions.

3. The mode transition matrix measuring system in accordance with claim 2, wherein said input-output optic means comprises third and fourth fiber optic switches operable in unison to allow selection between third and fourth optical paths, said third optical path comprising the outputs of said third and fourth fiber optic switches terminated with fiber optic connectors which are mated to each other to provide a reference fiber, and said fourth optical path comprising the outputs of said third and fourth fiber optic switches terminated with fiber optic connectors which are mated to said passive fiber optic component being tested, and said third switch is serially connected to said second switch of said mode selective launcher means.

4. The mode transition matrix measuring system in accordance with claim 3, wherein said mode selective detection means comprises fifth and sixth fiber optic switches operable in unison to allow selection between fifth and sixth optical paths, said fifth fiber optic switch being serially connected to said fourth fiber optic switch of said input-output optic means, said sixth fiber optic switch being serially connected to a detection circuit, said fifth optical path comprising a short piece of undersized optical fiber to filter high order modes, and said sixth optical path comprising an uninterrupted path to said detection circuit.

5. The mode transition matrix measuring system in accordance with claim 3, wherein said means of data storage and matrix calculation comprise:
   means for grouping power measurements obtained from said optical paths into first and second matrices, said first matrix comprising an input matrix which describes the power propagating through said reference fiber, and said second matrix comprising an output matrix which describes the power propagated through said passive fiber optic component being tested;
   means for obtaining the fiber optic component's matrix relative to selected mode groups;
   means for calculating a mode transition matrix; and
   means for determining a transformation matrix from one of a description of the fiber used in the mode filters and an experimental measurement.

6. The mode transition matrix measuring system in accordance with claim 1, wherein each of said optical courses comprises a different combination of a selected one of said plurality of optical paths from said mode selective launching means, a selected one of said reference optical path and said optical path for said component under test, from said input-output optic means, and a selected one of said plurality of optical paths from said mode selective detection means.

7. The mode transition matrix measuring system in accordance with claim 1, and including a microprocessor, said mode selective launcher means, said input-output optic means, and said selective detection means being controlled by said microprocessor.

* * * * *